(12) United States Patent
Dusik

(10) Patent No.: US 7,837,420 B2
(45) Date of Patent: Nov. 23, 2010

(54) VEHICLE STORAGE AND TRANSPORTATION RACK

(76) Inventor: Joseph Patrick Dusik, 27640 Weddel, Brownstown, MI (US) 48183

( * ) Notice: Subject to any disclaimer, the term of this patent is extended or adjusted under 35 U.S.C. 154(b) by 487 days.

(21) Appl. No.: 11/861,946

(22) Filed: Sep. 26, 2007

(65) Prior Publication Data

US 2009/0080992 A1 Mar. 26, 2009

(51) Int. Cl.
*B60P 7/08* (2006.01)
(52) U.S. Cl. ...................................... 410/26
(58) Field of Classification Search ............... 410/2, 410/3, 4, 7, 13, 6, 24, 26, 29.1; 224/403, 224/404; 211/85.8, 195; 414/462, 537, 538; 296/3
See application file for complete search history.

(56) References Cited

U.S. PATENT DOCUMENTS

| | | | |
|---|---|---|---|
| 2,135,857 A | 11/1938 | Stahl | |
| 5,649,732 A | 7/1997 | Jordan et al. | |
| 5,924,248 A | 7/1999 | Cox et al. | |
| 6,036,417 A | 3/2000 | Weaver | |
| 6,059,496 A | 5/2000 | Stevens | |
| 6,139,235 A | 10/2000 | Vander Koy et al. | |
| 6,139,247 A | 10/2000 | Wright | |
| 6,450,472 B1 | 9/2002 | Cook, Jr. | |
| 6,485,237 B1 * | 11/2002 | Sandwith | 410/24 |
| 6,502,730 B2 | 1/2003 | Johnson | |
| 6,524,055 B1 | 2/2003 | Overbye | |
| 6,533,337 B1 | 3/2003 | Harshman et al. | |
| 6,536,822 B1 | 3/2003 | Vagedes et al. | |
| 6,698,994 B2 | 3/2004 | Barrett | |

* cited by examiner

*Primary Examiner*—Stephen Gordon
(74) *Attorney, Agent, or Firm*—Matthew A. Pequignot; Pequignot + Myers LLC

(57) ABSTRACT

Apparatus for loading, storing, and/or transporting multiple All-Terrain-Vehicles. In a preferred embodiment, apparatus for loading and carrying two ATV's, one above the other, for storage and/or transportation purposes. In further preferred embodiments, apparatus capable of loading, storing, and/or transporting three All-Terrain-Vehicles in a compact configuration.

11 Claims, 4 Drawing Sheets

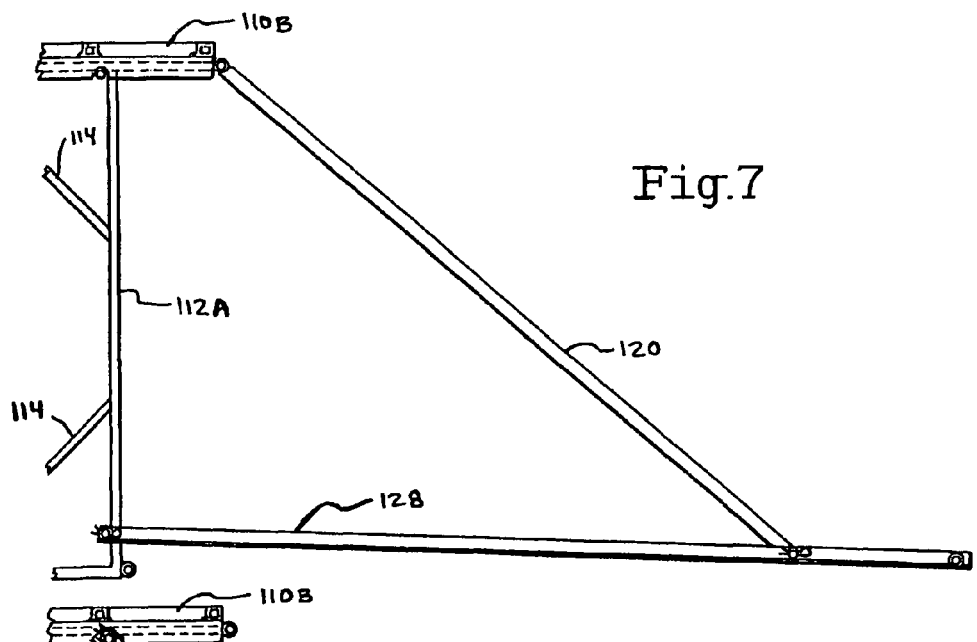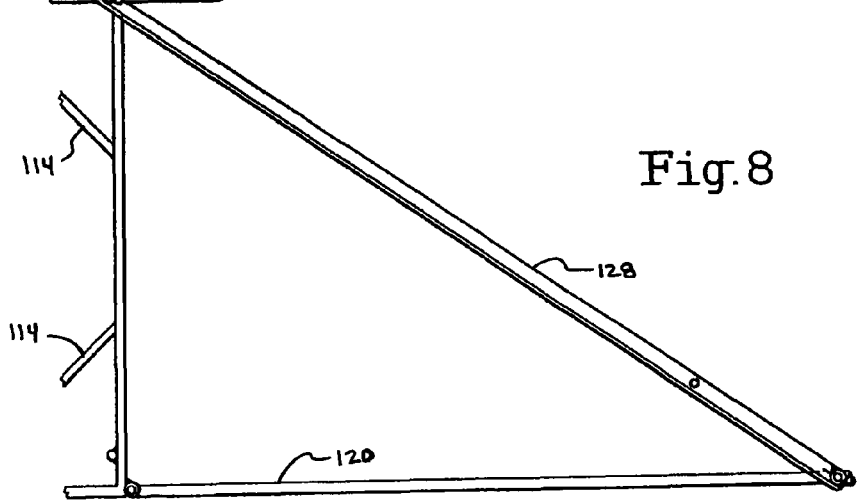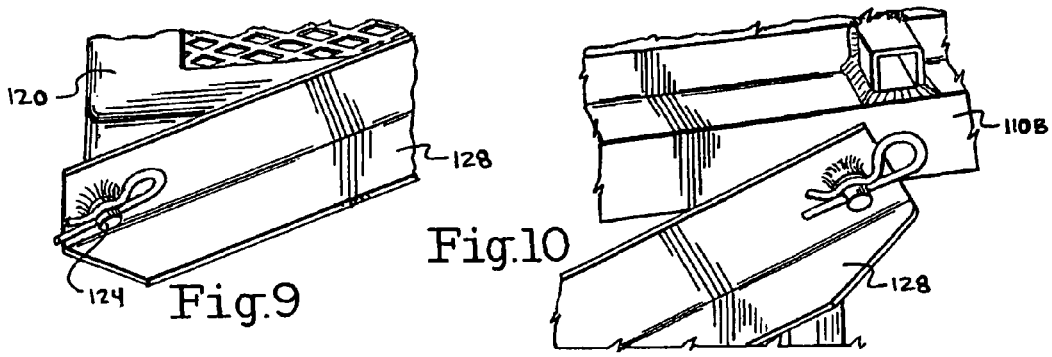

VEHICLE STORAGE AND TRANSPORTATION RACK

FIELD OF THE INVENTION

This invention relates to apparatus capable of loading, transporting, and/or supporting at least two vehicles, such as All-Terrain-Vehicles, vertically spaced one from another. In other embodiments, this invention relates to apparatus capable of loading, transporting, and/or supporting three vehicles, such as All-Terrain-Vehicles, in a compact configuration.

BACKGROUND OF THE INVENTION

Due to the popularity of All-Terrain-Vehicles (hereinafter "ATVs") during the last several decades, a variety of methods and devices have been developed over the years for storing and/or transporting ATVs and/or ATV-type vehicles.

Early methods of transporting ATV(s) involved simply towing the ATV(s) on a trailer behind a truck or other passenger vehicle type. Because trailers are large, cumbersome and generally limit the speed and a maneuverability of the vehicles towing them, alternatives to towing ATVs via trailer have been developed. For example, various devices have been created for securing a single ATV in a conventional truck bed or suspended at the back of a passenger vehicle by means of a carrying device attached to a tow hitch. Still further devices manage the transportation of two ATVs by loading one in the truck bed and the second on a platform attached to a tow hitch.

Although the devices disclosed in the foregoing patents may be viewed as improvements over conventional trailers, various drawbacks exist with such devices. In this regard, none of the aforementioned devices store or transport ATVs in the most space efficient manner possible. Furthermore, loading ATVs on such devices can be difficult and/or time consuming. Still furthermore, no known apparatus is capable of carrying more than two ATVs in a compact configuration such that they can be loaded into a conventional passenger truck bed. Yet still furthermore, no apparatus is known which is adaptable to transport more than two ATVs in a conventional truck bed and which can be removed from the truck bed in order so that ATVs can be stored in the apparatus in a compact configuration in a garage, for example.

In view of the above-enumerated drawbacks with known devices, it is apparent that there exists a need for apparatus which overcome at least one, and preferably several, of the above drawbacks. It is a purpose of this invention to fulfill these needs in the art, as well as other needs which will become apparent to the skilled artisan once given the below disclosure.

SUMMARY OF THE INVENTION

Generally speaking, this invention fulfills the above-described needs in the art by providing: apparatus for loading, storing, and transporting all-terrain-vehicles comprising:
 a lower vehicle support means for carrying a first vehicle;
 an upper vehicle support means vertically spaced from the lower vehicle support means for carrying a second vehicle;
 the upper vehicle support means connected to the lower vehicle support means by a frame; and
 the upper vehicle support means being pivotally attached to the frame such that the upper vehicle support means is pivotable in a generally upward direction thereby to allow entry and egress of the first vehicle onto and off of the lower vehicle support means.

In one embodiment, the apparatus is designed to carry all-terrain vehicles, and the apparatus may be selectively installed in a truck bed for all terrain vehicle transport or removed for use for all terrain vehicle storage.

In other embodiments, the lower vehicle support means may include wheel support members capable of carrying an all terrain vehicle by supporting wheels thereof, and the upper vehicle support means includes wheel support members capable of carrying an all terrain vehicle by supporting wheels thereof. The frame may include a plurality of structural support members extending between and connecting the lower vehicle support means to the upper vehicle support means. Further, the upper vehicle support means may include a first pair of inclined ramp surfaces joined to a second pair of oppositely inclined ramp surfaces.

The apparatus may, in some embodiments, include a pair of selectively attachable loading ramps which are selectively attachable proximal the upper vehicle support means and the lower vehicle support means thereby to allow, alternately, loading of all terrain vehicles onto the upper and lower vehicle support means. The apparatus may further include a winch so located attached to the apparatus such that when the loading ramps are attached proximal the upper vehicle support means (or the lower vehicle support means) for loading of an all terrain vehicle thereon, the winch is capable of hauling an all terrain vehicle onto the upper vehicle support means (or the lower vehicle support means) via the loading ramps.

The lower vehicle support means may include a first pair of horizontally spaced apart longitudinal members for substantially securing at least a first wheel; and a second pair of horizontally spaced apart longitudinal members for substantially securing at least a second wheel. Further, the peaks formed by the junction of the first pair of inclined ramp surfaces to the second pair of oppositely inclined ramped surfaces are capable of retaining a vehicle on the upper vehicle support means. In other embodiments, the apparatus may further include a crossbar selectively attachable to the frame thereby to secure an all terrain vehicle on the lower vehicle support means.

In still further embodiments, the apparatus may include a pair of selectively attachable loading ramps which are selectively attachable proximal the upper vehicle support means and the lower vehicle support means thereby to allow, alternately, loading of all terrain vehicles onto said upper and lower vehicle support means; with the loading ramps further being usable and attachable proximal the lower vehicle support means in a substantially horizontal orientation thereby to provide a vehicle support surface for carrying a third vehicle, such as an all terrain vehicle. The vehicle support surface for carrying a third vehicle may be supported in the substantially horizontal orientation via braces selectively connectable between the loading ramps and proximal said frame.

BRIEF DESCRIPTION OF THE DRAWINGS

FIG. 7. illustrates a profile view of the loading ramps and braces which are attached to the upper vehicle support means and frame, respectively, of a vehicle rack of the present invention as well as to each other, for moving an ATV up the loading ramps onto the upper vehicle support means.

FIG. 8. illustrates a profile view of the loading ramps and braces which are attached to the lower and upper vehicle support means, respectively, as well as to each other, for securing a third ATV onto the loading ramps.

FIG. 9. illustrates a detailed view of the attachment of one of the braces to one of the loading ramps by use of an attachment pin which extends through holes on the brace and loading ramp and is locked in place with a locking pin.

FIG. 10. illustrates a detailed view of the attachment of one of the braces to the upper vehicle support member by use of an attachment pin which extends through holes on the brace and upper vehicle support member and is locked in place with a locking pin.

DETAILED DESCRIPTION OF CERTAIN EMBODIMENTS

For a more complete understanding of the present invention and advantages thereof, reference is now made to the following description of various illustrative and non-limiting embodiments thereof, taken in conjunction with the accompanying drawings in which like reference numbers indicate like features.

The present invention is directed to a vehicle rack for loading, transporting, and/or supporting at least two vehicles, such as ATVs, vertically spaced one from another. The present invention, in alternative embodiments, is further directed to a vehicle rack for loading, transporting, and/or supporting three vehicles, such as ATVs, in a compact configuration. A vehicle rack of the present invention permits the transportation of ATVs, desirably two or more ATVs, in the bed of a conventional passenger truck. After use in transporting ATVs, the vehicle rack may be removed from the bed of the truck and used in a compact configuration to store one or more ATVs, such as in a garage. Supporting such uses, certain embodiments of the invention, accordingly, are easy to maneuver, versatile and simple in overall operation.

Figure 1:
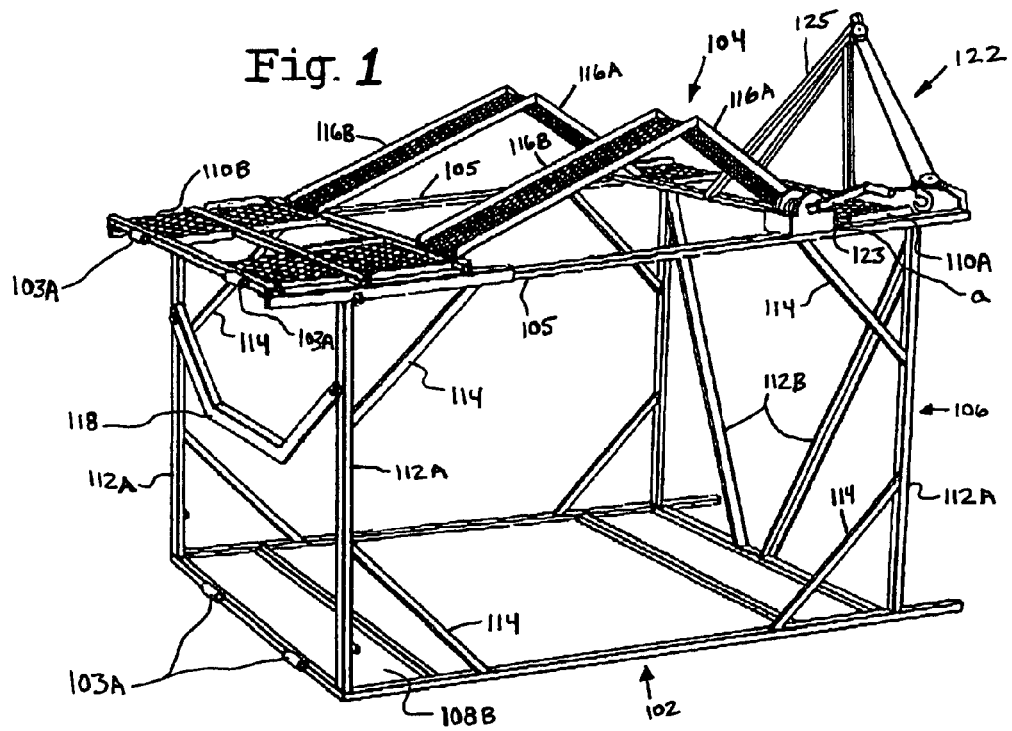
FIG. 1 illustrates one embodiment of a vehicle storage and transportation rack according to the present invention.

Turning now to FIG. 1, a vehicle rack 100 as one embodiment of the present invention is shown. In the embodiment shown in FIG. 1, vehicle rack 100 includes a lower vehicle support member 102 and an upper vehicle support member 104, each of which is for supporting an ATV. A frame 106 connects lower and upper vehicle support members 102 and 104, respectively, and includes for this purpose structural support members 112A which extend upwardly from lower vehicle support member 102 and downwardly from upper vehicle support member 104. Frame 106 further includes structural support members 112B which extend upwardly from lower vehicle support member 102 at a particular angle to provide structural support to vehicle rack 100 while also restricting forward movement of an ATV parked on lower vehicle support member 102. Structural support members 112B may extend upwardly from lower vehicle support member 102 and attach to structural support members 112A proximal upper vehicle support member 104, or may attach directly to upper vehicle support member 104. The angles at which structural support members 112B are situated relative to lower vehicle support member 102, upper vehicle support member 104 and/or structural support member 112A may be any suitable angles that afford structural support members 112B the aforementioned characteristics.

A plurality of reinforcing support members 114 are optionally present, and are desirable for providing for providing overall support and strength to vehicle rack 100, and for restricting the lateral movement of an ATV parked on lower vehicle support member 102.

Lower vehicle support member 102 includes one or more lower vehicle wheel supports (or carrying members). The embodiment shown in FIG. 1 shows a lower vehicle first wheel support 108A and a lower vehicle second wheel support 108B, each of which preferably comprises two horizontally spaced longitudinal members for defining a space into which the front and rear wheel of an ATV will rest (and thereby be carried) when such ATV is parked on lower vehicle support member 102. The horizontal space defined by these longitudinal members may include a solid or mesh platform, but in the embodiment shown in FIG. 1, define, simply, an open space. One skilled in the art will appreciate that other embodiments are possible and within the scope of the present invention, for example, where lower vehicle first wheel support 108A and lower vehicle second wheel support 108B are combined as a single solid or mesh platform.

Upper vehicle support member 104 includes upper vehicle first and second wheel supports 110A and 110B for supporting the front and rear wheels, respectively, of an ATV positioned on upper vehicle support member 104 (thereby to carry the full weight of the ATV). In the preferred (but optional) embodiment shown in FIG. 1, upper vehicle first and second wheel supports 110A and 110B, respectively, are wire mesh platforms. The use of such platforms is desirable as they permit desirable traction between the platforms and the wheels of an ATV parked thereon, while simultaneously generally preventing the build-up of debris of the platforms. Moreover, they are relatively light in weight. In other embodiments within the scope of the present invention, one skilled in the art will readily appreciate that these platforms may be of other configurations. For example, they may comprise solid platform members or horizontally spaced members defining open spaces.

Upper vehicle support member 104 further includes a first pair of inclined ramp surfaces 116A and a second pair of inclined ramp surfaces 116B which are oppositely inclined from 116A. Inclined ramp surfaces 116A and 116B are attached each to the other such as to desirably form a peak at the junction therebetween, thereby permitting an ATV to be substantially retained on upper vehicle support member 104. The peak thus formed may be of any suitable angle such as necessary to restrict forward and rearward movement of an ATV "parked" (or carried) on upper vehicle support member 104. Upper vehicle support member 104 further includes a plurality of longitudinal support members 105 which are desirably horizontally spaced one from the other and which provide structural support to member 104. Alternative embodiments employing different structural arrangements and parts are, nevertheless, contemplated.

Figure 4:
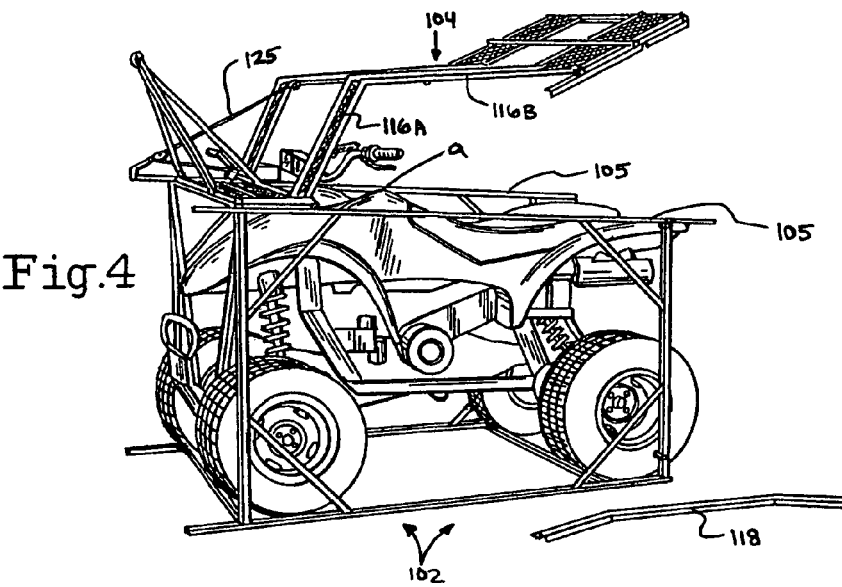
FIG. 4. illustrates a vehicle rack of the present invention with the upper vehicle support means pivoted upwardly and an ATV parked on the lower vehicle support means.
Figure 5:
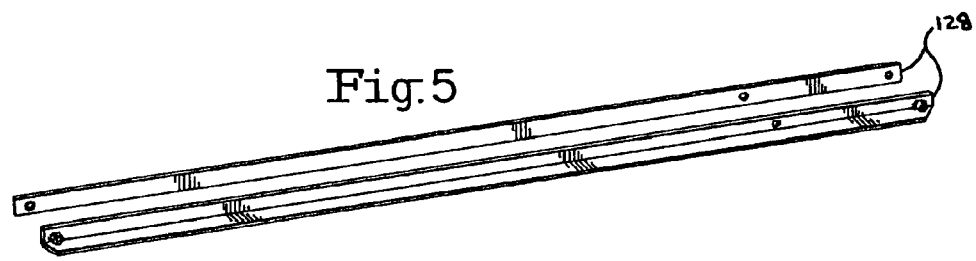
FIG. 5. illustrates braces used to support the loading ramps in various loading and unloading positions when utilizing the present invention.

As shown best in example FIG. 4, upper vehicle support member 104 is desirably capable of pivoting about an axis "a"

(by way of a conventionally designed pivot connection or mechanism) in order to open upwardly away from longitudinal support members 105 as well as lower vehicle support member 102. In the desirable embodiment illustrated, the light weight and advantageously designed pivot mechanism of upper vehicle support member 104 permits it to be easily manually pivoted by a user upwardly from longitudinal support members 105, in order to provide clearance to move an ATV onto lower vehicle support member 102 and park such ATV thereon.

In certain preferred embodiments, a mechanism for providing lift assistance is employed to assist in lifting or "opening" upper vehicle support member 104 as well as to maintain support member 104 in an open position during vehicle loading and unloading operations. An example mechanism useful for achieving this functionality and result is a gas charged spring or hydraulic cylinder, such as those used for car trunks and the like. Alternatively, in another embodiment of the present invention, cable 125, which is part of winch 122, may be solely employed to raise and lower upper vehicle support member 104 as well as to hold it in place.

Figure 2:
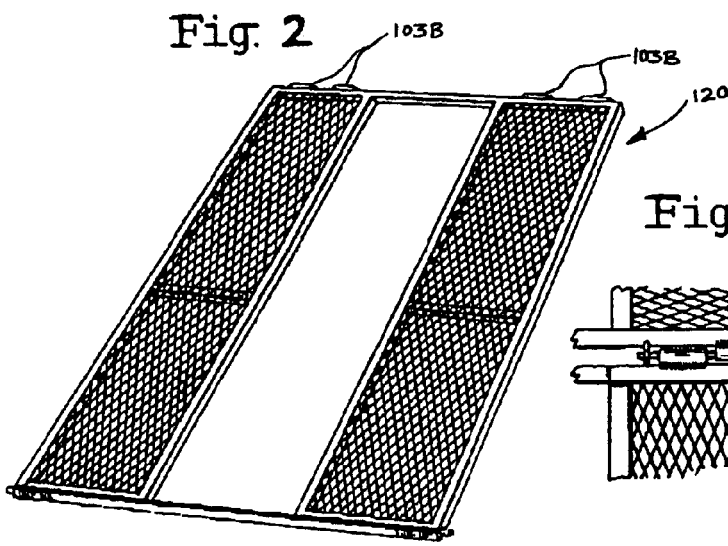
FIG. 2 illustrates loading ramps useful with the embodiment of the invention illustrated in FIG. 1.
Figure 3:
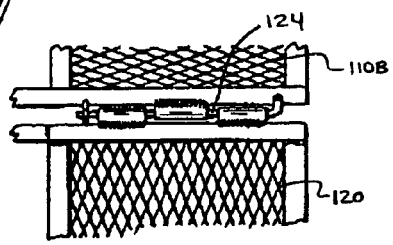
FIG. 3. illustrates an example method of attachment of loading ramps to a vehicle rack according to the present invention.

Turning now again to the desirable embodiment shown in FIG. 1, welded to upper vehicle rear wheel support 110B and lower vehicle rear wheel support 108B is a plurality of steel tubing 103A used, in part, as a mechanism for securing loading ramps 120 (shown in FIG. 2) thereto. Loading ramps 120, likewise, employ steel tubing 103B in order that loading ramps 120 may be secured to upper or lower vehicle rear wheel supports, 110B or 108B, respectively, such as by insertion of securing pins therein. As shown in FIG. 3, in this regard, an attachment pin 124, desirably, but optionally, comprised of steel, is inserted through the welded steel tubing 103B and 103A on each of loading ramps 120 and upper vehicle rear wheel support 110B, respectively thereby effectively securing the ramps to the upper vehicle support surface for loading and unloading use.

Loading ramps 120 (FIG. 2) are for, in part, permitting an ATV or other motor vehicle to be easily loaded and unloaded onto upper vehicle support member 104 (or onto the lower vehicle support member when the transportation rack is in an elevated position). The ATV, for example, may be driven up loading ramps 120, may be pushed up loading ramps 120, or may be pulled up ramps 120 through the use of winch 122. An exemplar use of winch 122 is shown in this regard, in the embodiment set forth in FIG. 6. Specifically, the use of winch 122 permits an ATV to be drawn up loading ramps 120 and onto upper vehicle support member 104 in a safe and controlled manner. Winch 122 desirably includes a hand crank 123 (see FIG. 1) for manually pulling an ATV up loading ramps 120 through the use of cable 125. One skilled in the art will readily appreciate that winch 122 may be of any suitable configuration, including a motorized winch, and that such alternative embodiments are contemplated as included within the scope of the present invention.

Vehicle rack 100 further desirably includes a crossbar 118, which is selectively (e.g., removably) attachable to frame 106 at structural support members 112A for restricting the rearward movement of an ATV parked on lower vehicle support member 102. In use, crossbar 118 is removed from structural members 112A in order to move an ATV onto lower vehicle support member 102. Once an ATV is parked onto lower vehicle support member 102, crossbar 118 is reattached to structural members 112A, thereby restricting the rearward movement of the ATV and thereby securing it for transport.

As discussed previously, FIG. 4 shows upper vehicle support member 104 pivoted upwardly from longitudinal support members 105 in order to provide clearance such that a first ATV may be driven into vehicle rack 100 and parked on lower vehicle support member 102. Once such first ATV is parked on lower vehicle support member 102, upper vehicle support member 104 is pivoted downwardly (lowered) back to its original position and substantially flush with longitudinal support members 105.

Figure 6:
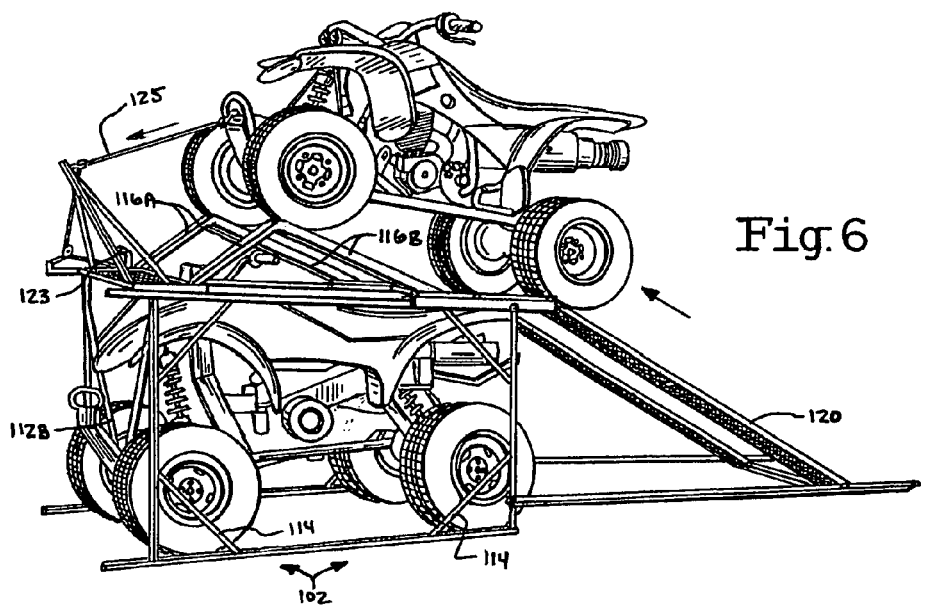
FIG. 6. illustrates a vehicle rack of the present invention having a first ATV parked on the lower vehicle support means, braces attached to the frame and to the loading ramps for securing the loading ramps, and a second ATV being pulled up the loading ramps onto the upper vehicle support means via a winch.

In one manner of operation as shown in FIG. 6, when ramps 120 are used to load a vehicle, braces 128 are attached to structural support members 112A at one end and to loading ramps 120 at the opposite end (with loading ramps 120 being further secured to upper vehicle rear wheel support 110B, as described previously). As such, braces 128 restrict the vertical and lateral movement of loading ramps 120 and permit an ATV to be safely brought up loading ramps 120 and onto upper vehicle support member 104, as described previously. FIG. 7 shows a profile view of braces 128 used in this manner.

Figure 11:
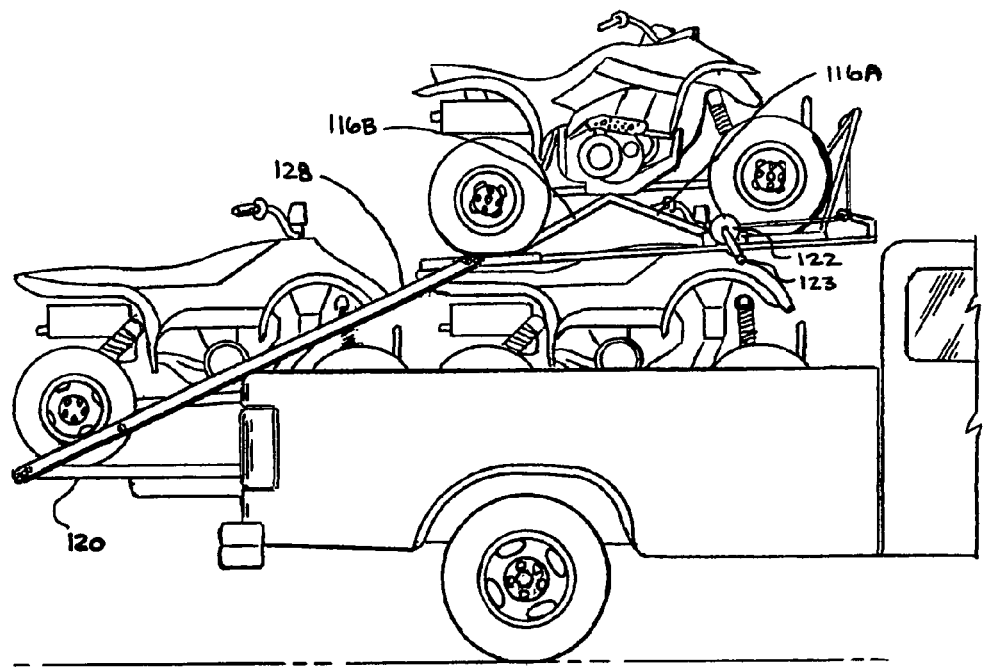
FIG. 11. illustrates one embodiment of a vehicle rack according to the present invention carried in the bed of a truck and transporting three ATVs.

Alternatively, braces 128 may also used for securing loading ramps 120 when loading ramps 120 are used to carry a third ATV, such as near or in the bed of a passenger truck as shown in FIG. 11. In such a configuration, braces 128 are attached at one end to upper vehicle support 104 at upper vehicle rear wheel support 110B and at the opposite end to loading ramps 120 which are further attached to lower vehicle support member 102 at or near lower vehicle rear wheel support 108B (not shown). Desirably, braces 128 are attached to these members through the use of attachment pins inserted through holes bored into braces 128, loading ramps 120, and upper vehicle rear wheel support 110B. To prevent lateral movement of such attachment pins, hitch pins are desirably inserted in the ends thereof. Moreover, bushings are desirably employed in all such holes in order to provide additional strength thereto. In alternative embodiments of the present invention, other means of attachment are, of course, contemplated.

Continuing with the discussion of this configuration, braces 128 secure loading ramps 120 in a substantially fixed and horizontal position and further restrict the lateral movement of a third ATV parked on loading ramps 120. FIG. 8, in this regard, shows a profile view of braces 128 used in this configuration. Moreover, FIGS. 9 and 10, respectively, show close-up views of the attachment of braces 128 to loading ramps 120 at a first end and to upper vehicle rear wheel support 110B at a second end. In addition to its use in the bed of a passenger truck, a vehicle rack 100 of the present invention may be used for storing one or more ATVs in other environments. As is readily apparent from the previous description, a vehicle rack of the present invention need only be placed in a garage or other storage facility and operated in the hereindescribed manner to serve as a storage rack (as opposed to a "transportation rack"). In this regard, a vehicle rack of the present invention may be alternately used for transporting a plurality of ATVs and then storing those ATVs at a desired location (or vice versa). Moreover, as will be readily apparent to one of skill in the art, the present invention may be adapted to store and transport more than three ATVs, for example, on a flatbed truck. In such an embodiment, the vehicle rack need only be extended and provided with the necessary vehicle supports in order to be used with the desired number of vehicles.

A vehicle rack of the present invention may be constructed of a variety of materials and may be of a variety of dimensions. In some embodiments, it is desirably constructed of steel or similar metal that permits the necessary strength to accommodate motor vehicles, such as ATVs, while, because of its configuration, at the same time being of such manageable weight as to be readily maneuvered onto and off of a transport vehicle and further such that the upper vehicle support member 104 is easily pivotable without undue strain on the user.

The following Example is illustrative of one manner in which of how a vehicle rack of the present invention may be used, and in no way limits the manner of use of the present invention as understood by one of skill in the art who will appreciate that numerous further embodiments are included in the present invention.

Example

A user desiring to transport three ATVs in a passenger truck places vehicle rack 100 in the bed of such truck. Crossbar 118 is removed and upper vehicle support member 104 is pivoted upwardly from longitudinal support members 105. Loading ramps 120 are attached to lower vehicle support member 102 at lower vehicle rear wheel support 108B by placing an attachment pin through steel tubing 103A and 103B. Loading ramps 120 are then lowered to the ground for ATVs to move upwardly thereon for vehicle loading. A first ATV is then brought up loading ramps 120 and parked onto lower vehicle support member 102. Such first ATV may be brought up loading ramps 120 by use of winch 122 but may also be driven or pushed up. Once such first ATV is parked onto lower vehicle support member 102, crossbar 118 is replaced and upper vehicle support member 104 is lowered downwardly such that it is substantially flush with longitudinal support members 105.

Loading ramps 120 are then detached from lower vehicle support member 102 and secured to upper vehicle support member 104 at upper vehicle rear wheel support 110B, as described previously. Braces 128 are then secured to loading ramps 120 and lower vehicle support member 102 at lower vehicle rear wheel support 108B, as described previously (and as shown in profile in FIG. 7). A second ATV is then brought up the second ramp and brought up loading ramps 120 and onto upper vehicle support member 104, again, desirably, by use of winch 122.

Once the second ATV is secured onto upper vehicle support member 104, loading ramps 120 are removed from upper vehicle rear wheel support 110B and attached to lower vehicle rear wheel support 108B, as described previously, where they may be thereafter used to load a third ATV. In this regard, a third ATV is brought up loading ramps 120 and, afterwards, while the vehicle is still on the ramps, loading ramps 120 are raised in a substantially horizontal manner and secured with braces 128. A profile view of this configuration is shown in FIG. 8 (see also FIG. 11).

ATVs may, of course, be unloaded from vehicle rack 100 in the reverse order in which they were loaded.

Once given the above disclosure, many other features, modifications, and improvements will become apparent to the skilled artisan. Such other features, modifications, and improvements are therefore considered to be part of this invention, the scope of which is to be determined by the following claims:

What is claimed is:

1. An apparatus for loading, storing, and transporting vehicles comprising:
   a lower vehicle support means for carrying a first vehicle;
   an upper vehicle support means vertically spaced from said lower vehicle support means for carrying a second vehicle;
   said upper vehicle support means connected to said lower vehicle support means by a frame;
   said upper vehicle support means being pivotally attached to said frame such that said upper vehicle support means is pivotable in a generally upward direction thereby to allow entry and egress of said first vehicle onto and off of said lower vehicle support means;
   wherein said lower vehicle support means comprises lower wheel support members capable of carrying an all terrain vehicle by supporting wheels thereof;
   wherein said upper vehicle support means comprises upper wheel support members capable of carrying an all terrain vehicle by supporting wheels thereof;
   wherein said frame comprises a plurality of structural support members extending between and operably connecting said lower vehicle support means and said upper vehicle support means; and
   wherein said upper vehicle support means includes a first pair of inclined ramp surfaces joined to a second pair of oppositely inclined ramp surfaces.

2. An apparatus according to claim 1, further including a pair of selectively attachable loading ramps, said loading ramps being selectively attachable alternatively proximal said upper vehicle support means and said lower vehicle support means thereby to allow, alternately, loading of all terrain vehicles onto said upper and lower vehicle support means.

3. An apparatus according to claim 2, further comprising a winch located attached to said apparatus such that when said loading ramps are attached proximal said upper vehicle support means for loading an all terrain vehicle thereon, said winch is capable of hauling an all terrain vehicle onto said upper vehicle support means via said loading ramps.

4. An apparatus according to claim 3, wherein said upper and lower wheel support members each comprise:
   a first pair of horizontally spaced apart longitudinal members for substantially securing at least a first wheel; and
   a second pair of horizontally spaced apart longitudinal members for substantially securing at least a second wheel.

5. An apparatus according to claim 4, wherein peaks formed by a junction of said first pair of inclined ramp surfaces to said second pair of oppositely inclined ramped surfaces permit an all terrain vehicle to be substantially securely retained on said upper vehicle support means.

6. An apparatus according to claim 5, further comprising a crossbar selectively attachable across an opening of said frame thereby to secure an all terrain vehicle on said lower vehicle support means.

7. An apparatus according to claim 1, further comprising a pair of selectively attachable loading ramps, said loading ramps being selectively attachable proximal said upper vehicle support means and said lower vehicle support means thereby to allow, alternately, loading of all terrain vehicles onto said upper and lower vehicle support means; and
   said loading ramps further being attachable proximal said lower vehicle support means in a substantially horizontal orientation thereby to provide a vehicle support surface for carrying a third vehicle.

8. An apparatus according to claim 7 wherein said vehicle support surface for carrying a third vehicle is supported in said substantially horizontal orientation, in part, via braces selectively connectable between said loading ramps and proximal said frame.

9. An apparatus according to claim 8, further including a winch located attached to said apparatus such that when said loading ramps are attached proximal said upper vehicle support means for loading of an all terrain vehicle thereon, said winch is capable of hauling an all terrain vehicle onto said upper vehicle support means via said loading ramps.

10. An apparatus according to claim 9, wherein peaks formed by a junction of said first pair of inclined ramp surfaces to said second pair of oppositely inclined ramp surfaces provide a wheel retaining capability for retaining an all terrain vehicle on said upper vehicle support means.

11. An apparatus according to claim 10, further comprising a crossbar selectively attachable across an opening of said frame thereby to secure an all terrain vehicle on said lower vehicle support means.

* * * * *